US007836351B2

(12) United States Patent  
Maharana et al.

(10) Patent No.: US 7,836,351 B2
(45) Date of Patent: *Nov. 16, 2010

(54) SYSTEM FOR PROVIDING AN ALTERNATIVE COMMUNICATION PATH IN A SAS CLUSTER (75) Inventors: Parag Maharana, Fremont, CA (US); Basavaraj Hallyal, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/387,043

(22) Filed: Apr. 27, 2009

(65) Prior Publication Data

US 2009/0217081 A1    Aug. 27, 2009

Related U.S. Application Data (63) Continuation of application No. 11/064,684, filed on Feb. 24, 2005, now Pat. No. 7,552,355.

(51) Int. Cl.
G06F 11/00 (2006.01)
G06F 11/20 (2006.01)

(52) U.S. Cl. .............................. 714/43; 714/4; 714/40; 714/56; 713/100

(58) Field of Classification Search ............ 714/43, 714/4, 40, 56; 718/106; 717/145, 149; 713/100
See application file for complete search history.

(56) References Cited

U.S. PATENT DOCUMENTS

| 5,081,624 | A  * | 1/1992  | Beukema .................... 714/4 |
| 6,052,739 | A  * | 4/2000  | Bopardikar et al. ......... 719/321 |
| 6,763,479 | B1 * | 7/2004  | Hebert ..................... 714/4 |
| 7,046,619 | B2 * | 5/2006  | Alagar et al. ............. 370/216 |
| 7,373,546 | B2 * | 5/2008  | Nguyen et al. ............. 714/5 |
| 7,444,537 | B2 * | 10/2008 | Findlay et al. ............ 714/4 |
| 7,668,962 | B2 * | 2/2010  | Tran et al. ............... 709/230 |
| 2003/0167366 | A1 * | 9/2003  | Radhakrishna ............. 710/262 |
| 2004/0062368 | A1 * | 4/2004  | Durkin ................... 379/93.02 |
| 2004/0109406 | A1 * | 6/2004  | Rothman et al. ........... 370/216 |
| 2004/0128569 | A1 * | 7/2004  | Wyatt et al. .............. 713/300 |
| 2005/0027751 | A1 * | 2/2005  | Davies et al. ............. 707/200 |
| 2005/0055602 | A1 * | 3/2005  | Werner et al. ............. 714/5 |
| 2005/0289386 | A1 * | 12/2005 | Tawil et al. .............. 714/6 |
| 2006/0235937 | A1 * | 10/2006 | Wu et al. ................. 709/214 |

* cited by examiner

Primary Examiner—Scott T Baderman
Assistant Examiner—Joseph Schell
(74) Attorney, Agent, or Firm—Suiter Swantz pc llo (57) ABSTRACT The present invention is a system and method for supporting an alternative peer-to-peer communication over a network in a SAS cluster when a node cannot communicate with another node through a normal I/O bus (Serial SCSI bus). At startup, driver may establish the alternative path for communication but may not use it as long as there is an I/O Path available. In the present invention, two types of P2P calls, such as event notification calls and cluster operation calls may be supported.

5 Claims, 6 Drawing Sheets

SYSTEM FOR PROVIDING AN ALTERNATIVE COMMUNICATION PATH IN A SAS CLUSTER

CROSS REFERENCE TO RELATED APPLICATIONS

The present application is a continuation application of U.S. patent application Ser. No. 11/064,684 filed on Feb. 24, 2005 now U.S. Pat. No. 7,552,355. U.S. patent application Ser. No. 11/064,684 is hereby incorporated by reference in its entirety.

FIELD OF THE INVENTION

The present invention generally relates to the field of small computer system interface, and particularly to a communication path in a serial attached SCSI (small computer system interface).

BACKGROUND OF THE INVENTION

Most IT departments in today's corporate world face growing user demands and shrinking budgets. Thus, storage vendors desire to develop cost efficient low-end systems with value-added features and availability levels typically found usually in enterprise class facilities. An example of such systems may be a serial attached SCSI (SAS) cluster system.

SAS was developed as the evolutionary replacement for parallel SCSI (SCSI capable of supporting Serial ATA). SAS was envisioned to become the universal interconnect technology for mid-range and enterprise storage systems supporting multiple applications and deployment models and negating the need for multiple incompatible storage infrastructures. SAS provides high-end enterprise features (such as Fibre Channel or the like), as well as the ability to support low-end desktop type storage media devices (such as Serial ATA or the like).

Figure 1:
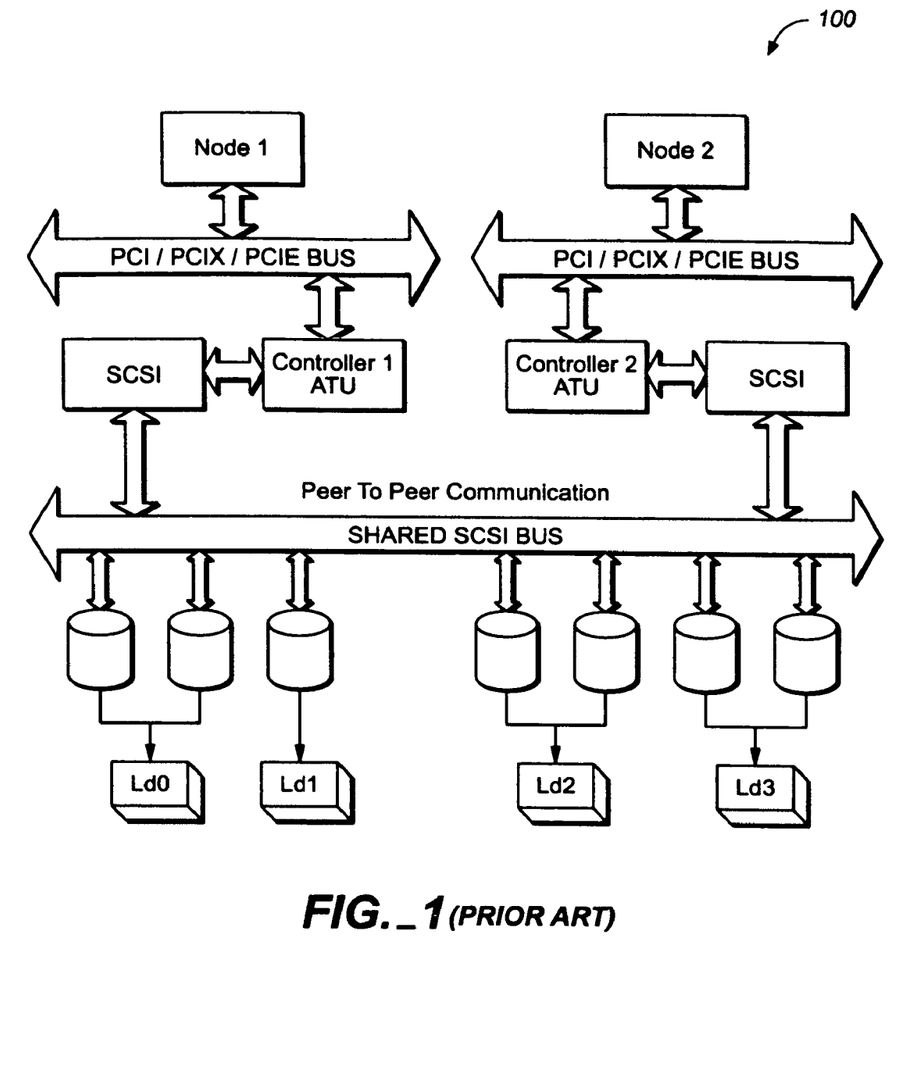
FIG. 1 is an illustration of a block diagram of an exemplary SCSI cluster.

A cluster connects two or more servers together so that they appear as a single computer to clients. Connecting servers in a cluster allows for workload sharing, enables a single point of operation/management, and provides a path for scaling to meet increased demand. Thus, clustering provides the ability to produce high availability applications. In FIG. 1, an illustration of a block diagram 100 of an exemplary SCSI cluster is shown. In the exemplary SCSI cluster, Node1 and Node2 are connected to share disks through different controllers connected to each node. The controllers are capable of communicating through a shared SCSI bus. This communication is often called Peer-To-Peer Communication (P2P). Thus, in a SCSI cluster environment, even if one node fails, a communication to the shared resources may be available through the shared SCSI bus.

Figure 2:
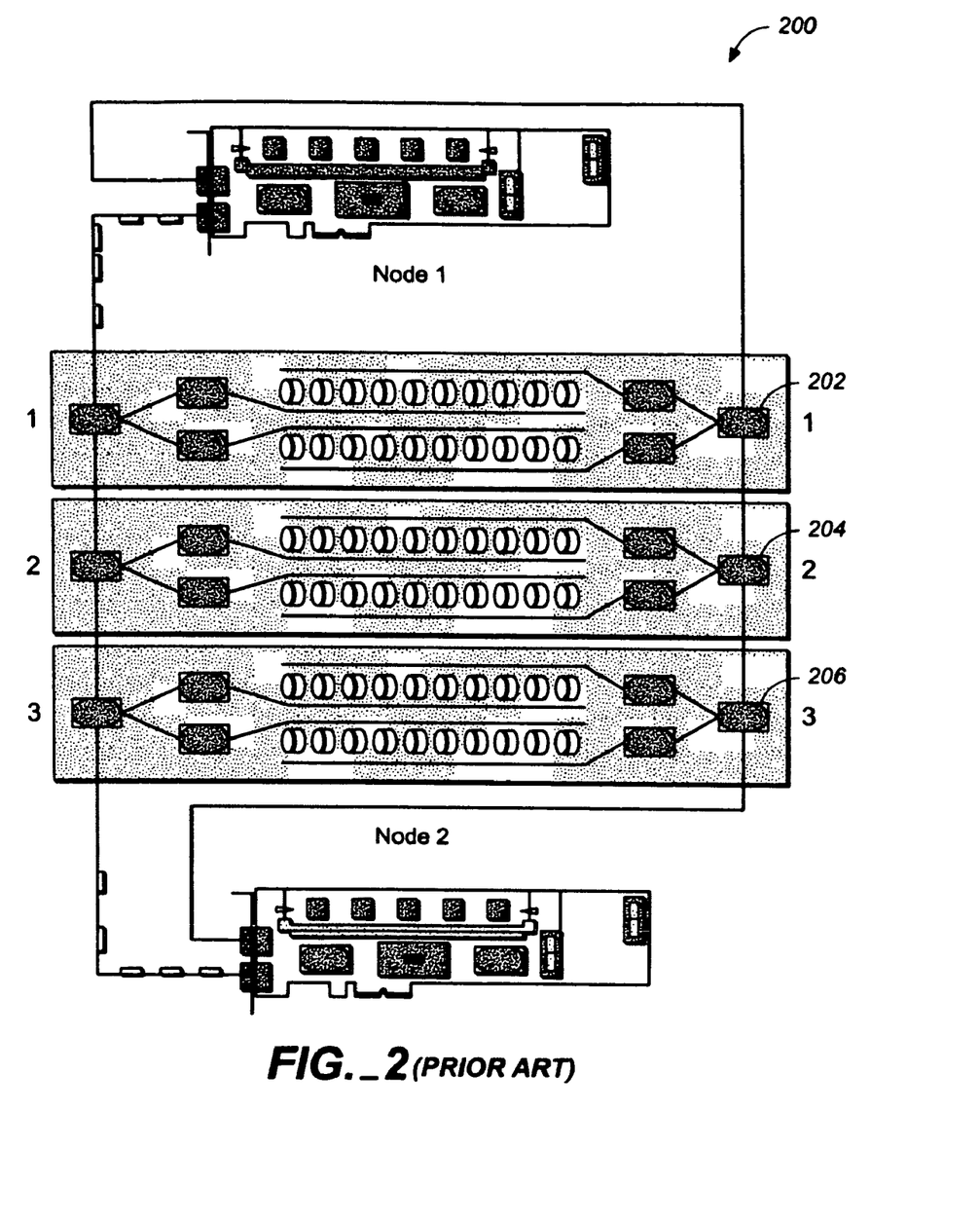
FIG. 2 is an illustration of a block diagram of an exemplary SAS cluster.

However, a SAS cluster does not comprise such a shared bus suitable for P2P communication. Instead, one to one serial buses are utilized. In FIG. 2, an illustration of a block diagram 200 of an exemplary SAS cluster is shown. Node1 may access enclosure 206 through enclosure 202 and enclosure 204. However, a conventional SAS cluster does not support P2P communication between nodes if an enclosure in a SAS cluster fails. Hence controller may not be able to access other disks serially connected through the failed enclosure.

Figure 3:
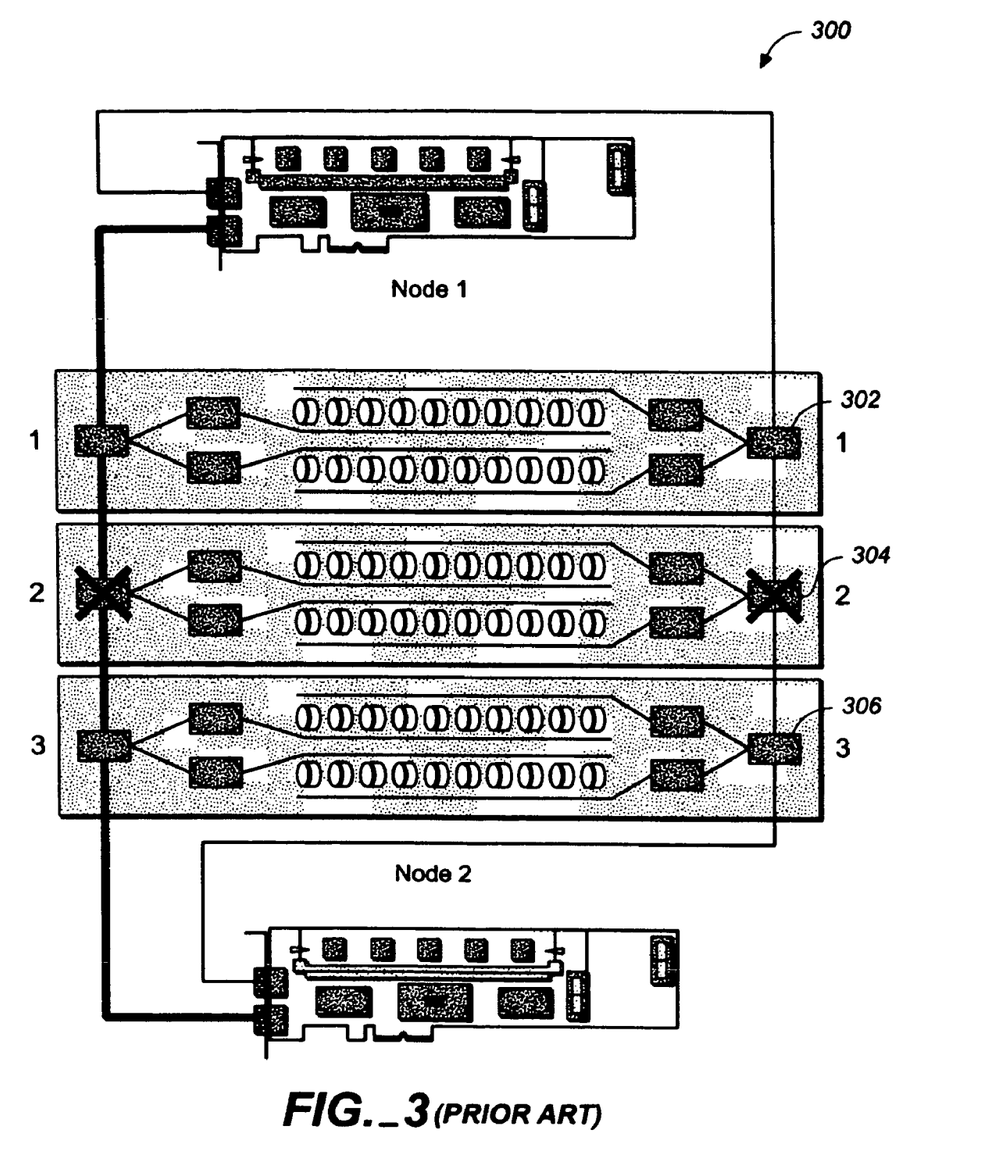
FIG. 3 is an illustration of a block diagram of an exemplary SAS cluster wherein one SAS enclosure has failed.

Referring now to FIG. 3, an illustration of a block diagram 300 of a SAS cluster with a failed enclosure is shown. In FIG. 3, when enclosure 304 fails, Node1 cannot access drives in enclosure 306 since the only I/O path (serial SCSI path) from Node1 to enclosure 306 is coupled to enclosure 304. Similarly, Node2 cannot access drives in enclosure 302. In the exemplary SAS cluster, Node1 cannot communicate with Node 2 once a normal I/O bus (Serial SCSI bus) is not available.

Therefore, it would be desirable to provide an alternative communication path in a SAS cluster so that a node may communicate with another node via a network when the node has lost its accessibility to shared drives. It would be also desirable to provide a system and method for supporting P2P calls which is suitable for being used through the alternative communication path in a SAS cluster.

SUMMARY OF THE INVENTION

Accordingly, the present invention is directed to a system and method for providing an alternative communication path over a network and supporting P2P calls suitable for being used through the alternative communication path in a SAS cluster.

In a first aspect of the present invention, a system supporting a P2P communication for a SAS cluster is provided. The system may comprise a first node and a second node. Each node may include a special driver and application. At startup, a driver in each node may establish an alternative path for communication over a network. The alternative path may not be utilized as long as a SCSI I/O path is available. The driver in the first node may register an asynchronous event notification (AEN) with its associated controller firmware. When the driver in the first node detects that the SCSI I/O path no longer exists, it may start utilizing the alternate path for its communication. A firmware in the first node may send a command failure special status to the driver in order to inform such a condition. The driver in the first node may pass this information to the application in the first node through an event trigger mechanism. The application in the first node may communicate to its peer-application (the application in the second node) over TCP/IP and the peer-application may send a command to a firmware in the second node via a driver. In this manner, the peer-to-peer communication for the SAS cluster may be provided over TCP/IP.

In a second aspect of the present invention, an events notification (Peer Update) may be supported for a P2P communication between nodes in a SAS cluster. When a first node has lost its accessibility to drives, the first node may communicate a second node via a network in order to access the drives. In each node of the SAS cluster, an application may be running in Client and Server mode. An application in the first node (a first application) may be in a Client mode. The first application may be waiting for its firmware to return any asynchronous events. Upon reception of any asynchronous events from the firmware, the first application may collect data and send a message over TCP/IP to a second application in a second node. When the second application receives the message, it may send an appropriate command based on the message to its firmware. The firmware in the second node may notify the second application completion of the command through its driver. When the second application receives completion of the command from its firmware, it may send back an acknowledgement (ACK) to the first application. When the first application receives the ACK from the second application, the first application may send an acknowledgement to the firmware via its driver.

In a third aspect of the present invention, a cluster support operation may be supported over a P2P communication between nodes in a SAS cluster. When the host operating system (OS) sends a request of a cluster support operation to the first driver, the first driver may send a request of the cluster support operation to the first firmware. If there is no way to access the other node through a normal I/O path, the first firmware may send back a peer-operation-call of the cluster support operation to the first driver through an event notification. The first application may send a message to the second application though the alternative path. The message may include the request of the cluster support operation and data provided from the first firmware. The second firmware may send a status of the cluster support operation to the second application after it receives the cluster support operation call which is based on the message sent by the first application. Upon reception of the status of the cluster support operation from the second firmware, the second application may send an acknowledgment regarding the cluster support operation to the first application. Then, the first application may pass the acknowledgment to the first firmware via the first driver. In return, the first firmware may issue a completion notification of the cluster support operation. When the first driver receives the completion notification, it may complete the request of the cluster support operation to the host OS.

In an advantageous aspect of the present invention, the application in each node may not require any special software.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention is directed to a system and method for supporting an alternative peer-to-peer communication over a network in a SAS cluster when a node cannot communicate with another node through a normal I/O bus (Serial SCSI bus). The system may comprise a first node, a second node, and several SAS enclosures which are serially connected to each other through a Serial SCSI I/O bus. Each node may comprise an application, a driver and a firmware. At initialization phase, an alternative path between a first application and a second application may be established. Then, events may be registered with a first driver. In return, the first driver may register an asynchronous event notification (AEN) with a first firmware based on the registered event. The first driver may pass the information regarding an AEN to the first application using event trigger mechanism. Then, the first application may communicate with its peer-application (an application in the second node) and the peer-application may send an appropriate command to a peer-firmware (a firmware in the second node). Additionally, the present invention may support various native cluster calls (cluster support operations) such as Reserve Logical Data (LD), a Release LD, a Reset LD, a Query-Reserve LD, and the like over the alternative path.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Figure 4:
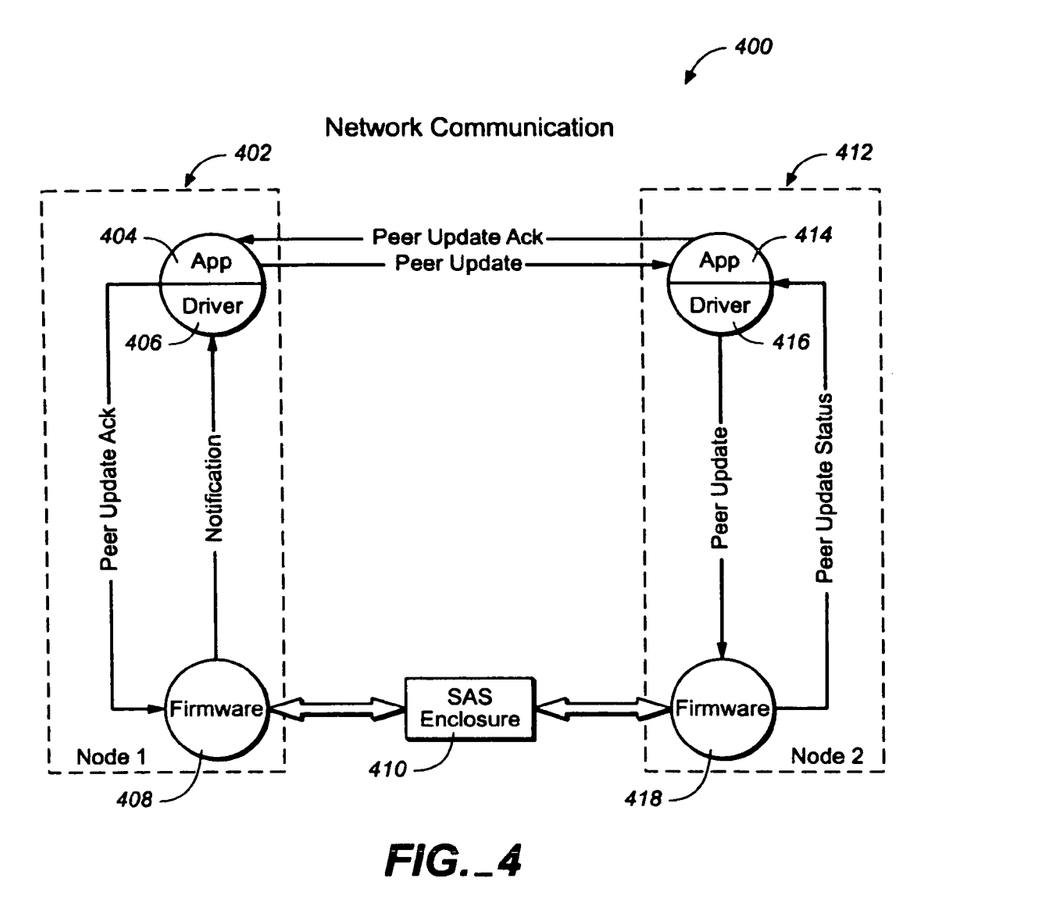
FIG. 4 is an illustration of an event notification state diagram in accordance with the present invention.
Figure 5:
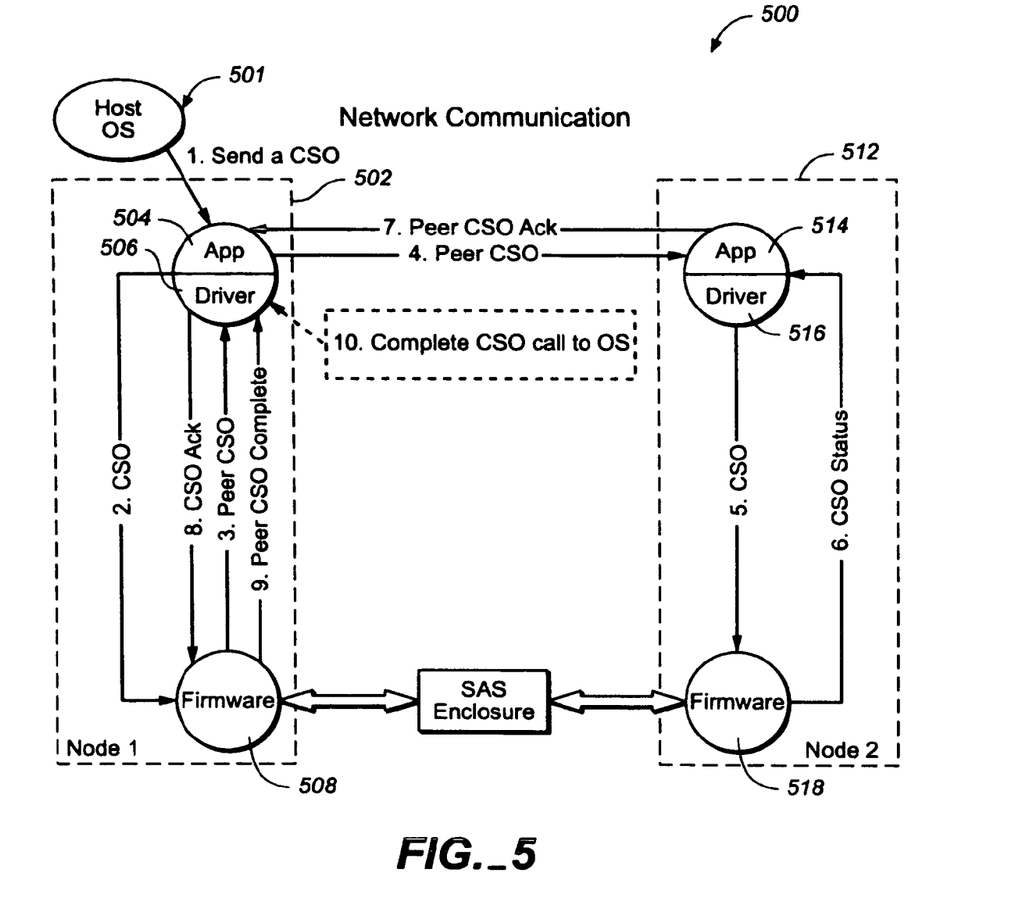
FIG. 5 is an illustration of a cluster support operation state diagram in accordance with the present invention.
Figure 6:
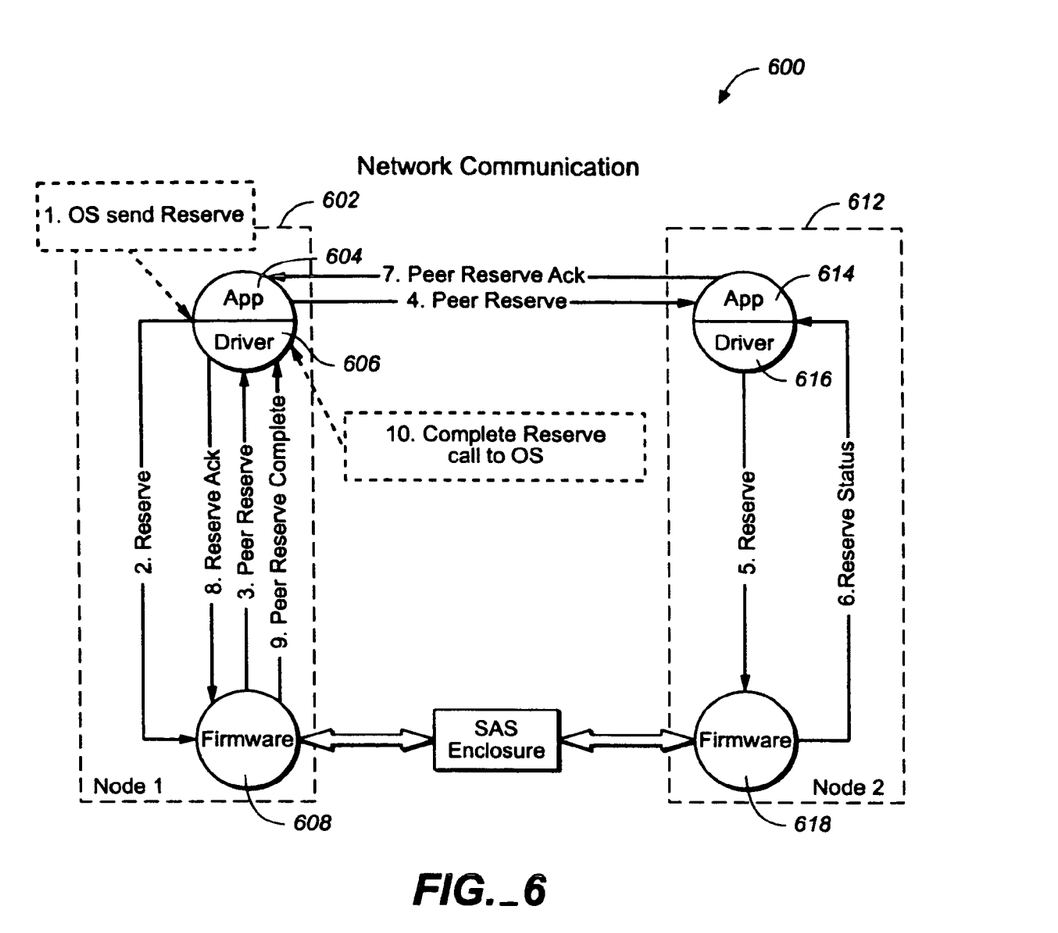
FIG. 6 is an illustration of a Reserve Logical Data Operation state diagram in accordance with the present invention.

Referring generally now to FIGS. 4 through 6, exemplary embodiments of the present invention are shown.

In an embodiment of the present invention, a system may provide a peer-to-peer communication path when one node of a SAS cluster lost its accessibility to its drives. The node may communicate through a serial SCSI I/O bus when there is no failed SAS enclosure in the SAS cluster. When there is a failure of any SAS enclosures, one node may not be able to access SAS enclosures serially connected to the failed SAS enclosure. In such a case, the node may have to request the other node to access the SAS enclosures. In order to send a request between two nodes, an application-to-application communication may be established through an alternative path over a network. In a particular embodiment of the present invention, the alternative path may be a P2P communication path using TCP/IP.

After an application-to-application communication is established, the application may establish an internal communication path to a firmware of the node. The application may look for a driver and controller combination in the node. Then, the application may register an event with the driver for any event and the driver register asynchronous event notifications with firmware. As such, the communication paths between the driver/firmware side and the peer-application side are established. Each application may start monitoring any asynchronous firmware events.

In an embodiment of the present invention, an application in each node of the SAS cluster may be running in both Client and Server mode. It is to be noted that there are various ways to implement the application in both Client and Server mode. For example, there may be two threads in the application. A client mode of application thread may be waiting for its firmware to return any AEN.

As soon as the client mode of application thread receives any AEN via its driver, it may collect data related to the AEN and send a message (e.g. Peer Update call or the like) over TCP/IP to other node's server mode application thread. As soon as the server mode application thread receives the message (e.g. Peer Update call or the like), it sends an appropriate command call to its firmware. A client mode application thread in the other node may be waiting for its firmware to complete the command call. When the client mode application thread receives completion of this command, it sends back an acknowledgement (ACK) to the server mode thread of the failed node. When the server mode thread of the failed node receives the ACK from its connected client mode application of the other node, it may send the ACK to its firmware via the driver.

Referring now to FIG. 4, an event notification state diagram 400 in accordance with the present invention is shown. A SAS cluster may comprise a first node 402, a second node 412 and at least one SAS enclosure 410. In a particular embodiment of the present invention, when any asynchronous event occurs, a first firmware 408 sends an asynchronous notification to a first driver 406. The first driver 406 may signal an event to a first application 404 upon reception of the asynchronous notification. Then, the first application 404 may query details of event occurrence. The first application 404 may send a message including details of event occurrence to a second application 414 running in the second node 412 which has established link with. After receiving this message, the second application 412 may send a command call based on the received message to its firmware 418 via a second driver 416. When the second firmware 418 completes the command call, the second application 414 may send a status of the command as an acknowledgement to the first application 404. When the first application 404 receives the acknowledgement, the first application 404 may send down this acknowledgement to its firmware 408.

In an embodiment of the present invention, various cluster support operations may be supported over a peer-to-peer communication between nodes in a SAS cluster. It is to be noted that various native cluster calls should be implemented in order to support SAS cluster. The native cluster calls (cluster support operations) may include a Reserve Logical Data (LD), a Release LD, a Reset LD, a Query-Reserve LD and the like.

Referring now to FIG. 5, an illustration of state diagram 500 of a cluster support operation in accordance of the present invention is shown.

In an embodiment of the present invention, cluster support operations may be supported over a peer-to-peer communication when a node cannot communicate with another node through a normal I/O bus (Serial SCSI bus). The host operating system (OS) may send a request of a cluster support operation (CSO) to a first driver 506 in a first node 502. Then, the first driver 506 may send a request command of the CSO to a first firmware 508 in the first node 502. The first firmware 508 may send back a peer-operation-call of the CSO (a peer-CSO) to the first driver 506 through an event notification. The first driver 506 may inform a first application 504 about the event notification regarding the peer-CSO. The first application 504 may query data and send a message to a second application 514 in a second node 512 though an alternative path. The message may include the request of the peer-CSO and data queried from the first firmware 508 via the first driver 506.

Upon reception of the message, the second application 514 may send a CSO call based on the message down to the second firmware 518 via the second driver 516. Then, the second firmware 518 may gather a status of the CSO and send it to the second application 514 via the second driver 516. Upon reception of the status of the CSO from the second firmware 518, the second application 516 may send an acknowledgment regarding the CSO (a peer-CSO ACK) to the first application 504. Then, the first application 504 passes a CSO acknowledgment to the first firmware 508 via the first driver 506. The first firmware 508 in return may inform the first driver of competition of the peer-CSO. Then, the first driver 506 may complete the request of the CSO to the host OS.

Referring now to FIG. 6, a state diagram 600 of a Reserve LD operation in accordance of the present invention is shown. In a particular embodiment, a driver 606 and a firmware 608 in a node 602 may maintain logical data reservation map in shared memory between the driver 606 and the firmware 608. When the driver 606 sends an ownership call to other node 612, it may set a flag indicating that the ownership call is pending. In addition to this flag, the driver 606 may maintain another flag (a second flag) for a second reserve call. When the driver 606 receives the second reserve call from the host OS before it resolves the first reserve all, it may immediately queue the second reserve call and set the second flag indicating that second reserve call is pending.

While the ownership call is pending, the driver 606 may receive an ownership call from other node. In such a case, a higher Id node may win the ownership. Once an ownership change happens, the driver 606 may send the request to the firmware 608 to update reservation status in its private copy of Id status from shared memory Id status. The firmware 608 may resume any background task (BGTASK) which has been aborted during release operation on other node. When the driver 606 receives the release call, the driver 606 may check its shared memory for the Id status. If it owns the LD, then it may send an ownership release call to other node 612. When the ownership call returns with status success, then it may update the shared Id status and send a release update call to the firmware 608. When the firmware 608 receives the release update, it may check for any BGTASK associated with the Id. If any BGTASK is operating, then it may abort (with current state information) and invoke an asynchronous notification to the driver 606 with current state information. The asynchronous notification may eventually be sent to other node 612. The application 614 in the other node 612 sends a command call based on the notification message to its firmware 618 through the driver 616. After the command is fully completed in the other node, an ACK may be sent from the application 614 in the other node 612 to the application 604 in the original node 602, which may in return send down the ACK to its firmware 608. Upon reception of the ACK, the firmware 608 may complete the original update release call to the driver 606. When the driver 606 receives update release completion from the firmware 608, it may complete the original release call to the host OS.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for providing a peer to peer communication for a SAS cluster wherein the SAS cluster includes a first node, a second node and at least one SAS enclosure serially connected to the first and second nodes, comprising:

a first firmware detecting an asynchronous event occurrence;

a first driver communicatively coupled to the first firmware, the first driver receiving an asynchronous event notification from the first firmware;

a first application communicatively coupled to the first driver, the first application querying details of the asynchronous event occurrence, including the details of the asynchronous event occurrence into an event notification message, and the first application sending the event notification message through an alternative path when the first driver signals the asynchronous event occurrence to the first application, wherein the alternative path has been established between the first application and a second application, the second application suitable for communicating with the first application through the alternative path, wherein the second application receives the event notification message including the details of the asynchronous event occurrence in the first node;

a second firmware suitable for communicating with the first firmware through the at least one SAS enclosure; and a second driver communicatively coupled to the second application, the second driver passing a command from the second application to the second firmware, the command being based on the event notification message which has been sent from the first application to the second application, wherein the first node includes the first application, the first driver, and the first firmware and the second node includes the second application, the second driver, and the second firmware, the second firmware sends a status of a cluster support operation to the second application via the second driver when the second firmware receives a cluster support operation call from the second application and the cluster support operation call is based on the message sent by the first application, and upon reception of the status of the cluster support operation from the second firmware, the second application sends an acknowledgment regarding the cluster support operation to the first application which in return passes the acknowledgment to the first firmware via the first driver.

2. The system as described in claim 1, wherein the first node and the second node are capable of performing a cluster support operation via the alternative path when there is at least one SAS enclosure failed.

3. The system as described in claim 2, wherein the cluster support operation includes a Reserve-logical-data operation, a Release-logical-data operation, a Reset-logical-data, and a Query Reserve-logical-data operation.

4. The system as described in claim 2, wherein the first driver sends a request of the cluster support operation to the first firmware upon reception of the request of the cluster support operation from an operating system.

5. The system as described in claim 4, wherein the first application sends a message including the request of the cluster support operation and data provided from the first firmware via the first driver to the second application though the alternative path.

* * * * *